United States Patent [19]

Moraru et al.

[11] Patent Number: 5,177,651
[45] Date of Patent: Jan. 5, 1993

[54] MAGNETIC MEDIA AND SERVO SYNCHRONIZATION METHOD

[75] Inventors: Alex Moraru, Fremont; Peter Skalon, Redwood City, both of Calif.

[73] Assignee: Konica Corporation, Tokyo, Japan

[21] Appl. No.: 137,803

[22] Filed: Dec. 23, 1987

[51] Int. Cl.⁵ .............................. G11B 5/596
[52] U.S. Cl. ..................... 360/77.08; 360/75
[58] Field of Search ............ 360/75, 77.01, 77.02, 360/77.07, 77.08, 77.05, 78.01, 78.04, 78.14, 135

[56] References Cited

U.S. PATENT DOCUMENTS

| | | | |
|---|---|---|---|
| 4,163,265 | 7/1979 | van Herk et al. | 360/77 |
| 4,205,357 | 5/1980 | Barton et al. | 360/135 |
| 4,287,540 | 9/1981 | Cheatham et al. | 360/77 |
| 4,297,737 | 10/1981 | Anderson et al. | 360/135 |
| 4,458,278 | 7/1984 | Maclay et al. | 360/99.05 |
| 4,636,884 | 1/1987 | Hattori et al. | 360/78.14 |
| 4,737,869 | 4/1988 | Sugaya et al. | 360/77 |
| 4,823,212 | 4/1989 | Knowles et al. | 360/77.08 |
| 4,833,551 | 5/1989 | Song | 360/77.05 |

FOREIGN PATENT DOCUMENTS 0042931 1/1982 European Pat. Off. .
0069548 1/1983 European Pat. Off. .
0088554 9/1983 European Pat. Off. .
0117688 9/1984 European Pat. Off. .

OTHER PUBLICATIONS

IBM TDB vol. 18, No. 10, "Track Following Servo System" Oswald, Mar. 1976, pp. 3424-3425.
8032 "Electronics", 59 (1986) Nov., No. 35, pp. 81-83 Entitled: How to Boost Floppy-Disk Capacity to 11 Megabytes.

*Primary Examiner*—Aristotelis Psitos
*Assistant Examiner*—Steven R. Garland
*Attorney, Agent, or Firm*—Law Offices of Thomas E. Schatzel

[57] ABSTRACT

A flexible data disk has consecutive servo tracks having a synchronization and alternate synchronization mark. The synchronization and alternate synchronization marks in each servo sector are radially aligned. Four magnetic pulses represent a synchronization mark and two magnetic pulses represent an alternate synchronization mark. The disk drive system will read and identify the synchronization marks and alternate synchronization marks and start generating timing pulses as appropriate. The servo bursts can then be read allowing the disk drive system to center the transducer head over the data tracks.

4 Claims, 6 Drawing Sheets

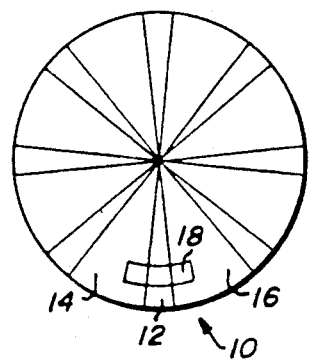
Fig_1
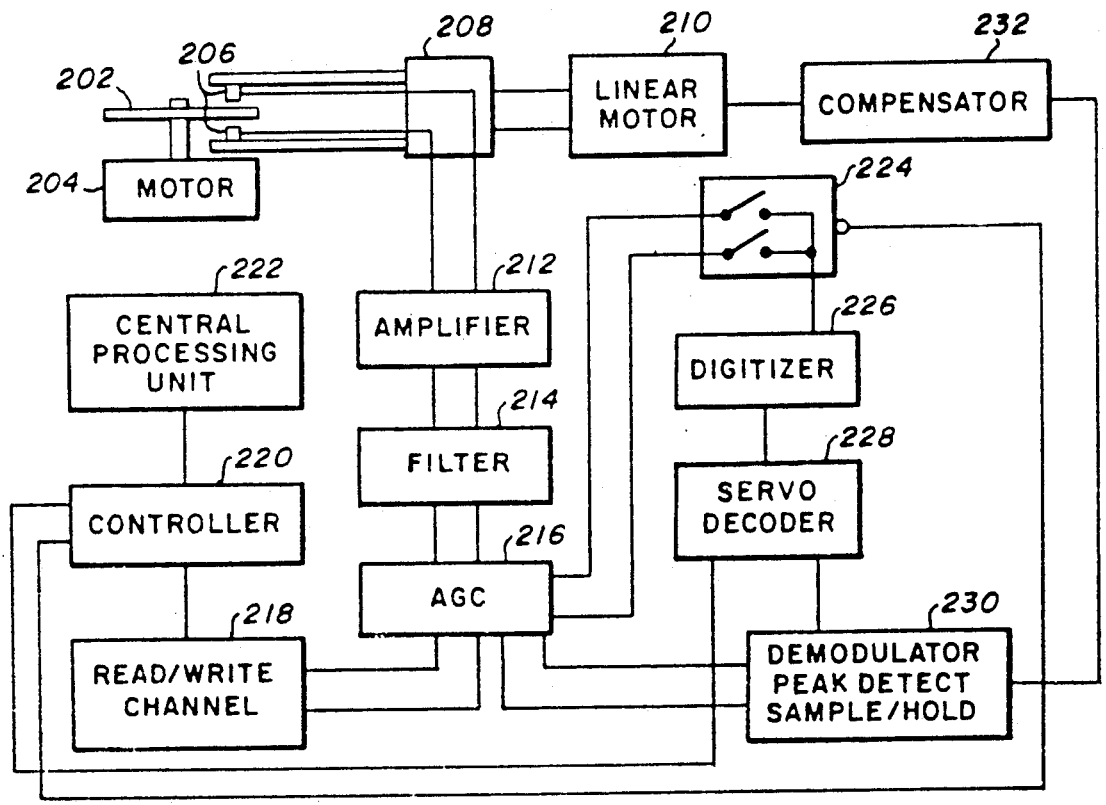
Fig_4

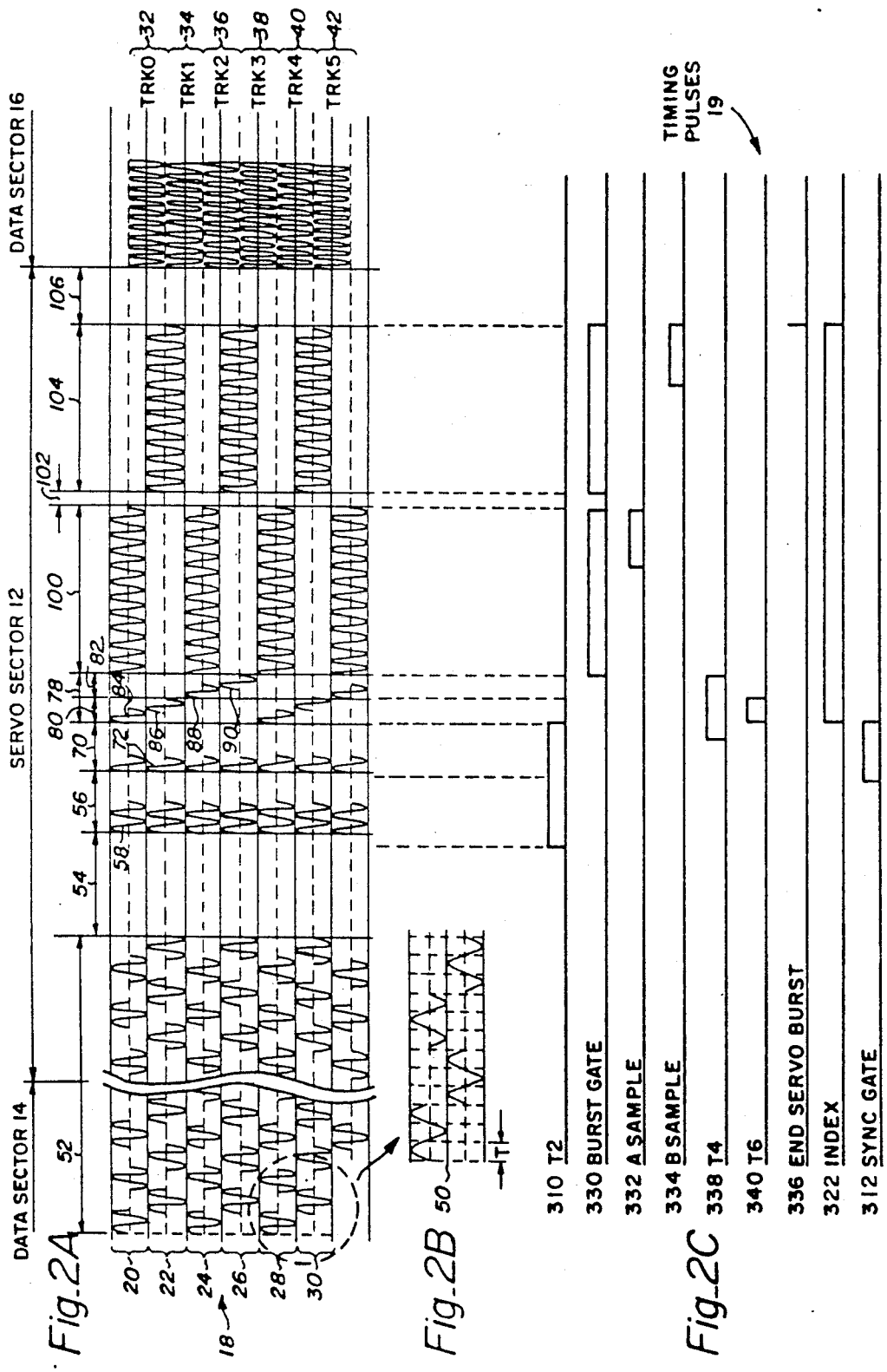

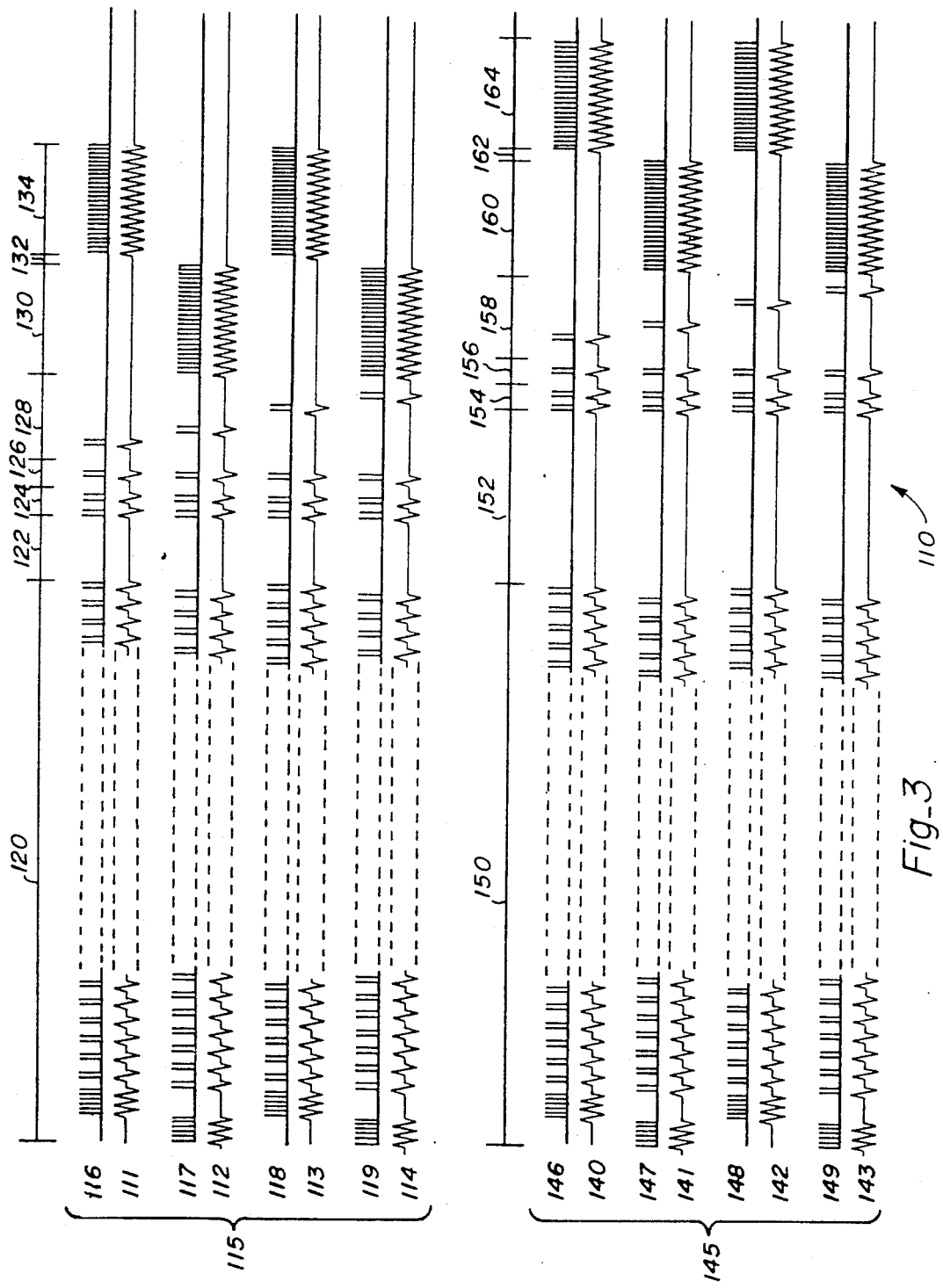

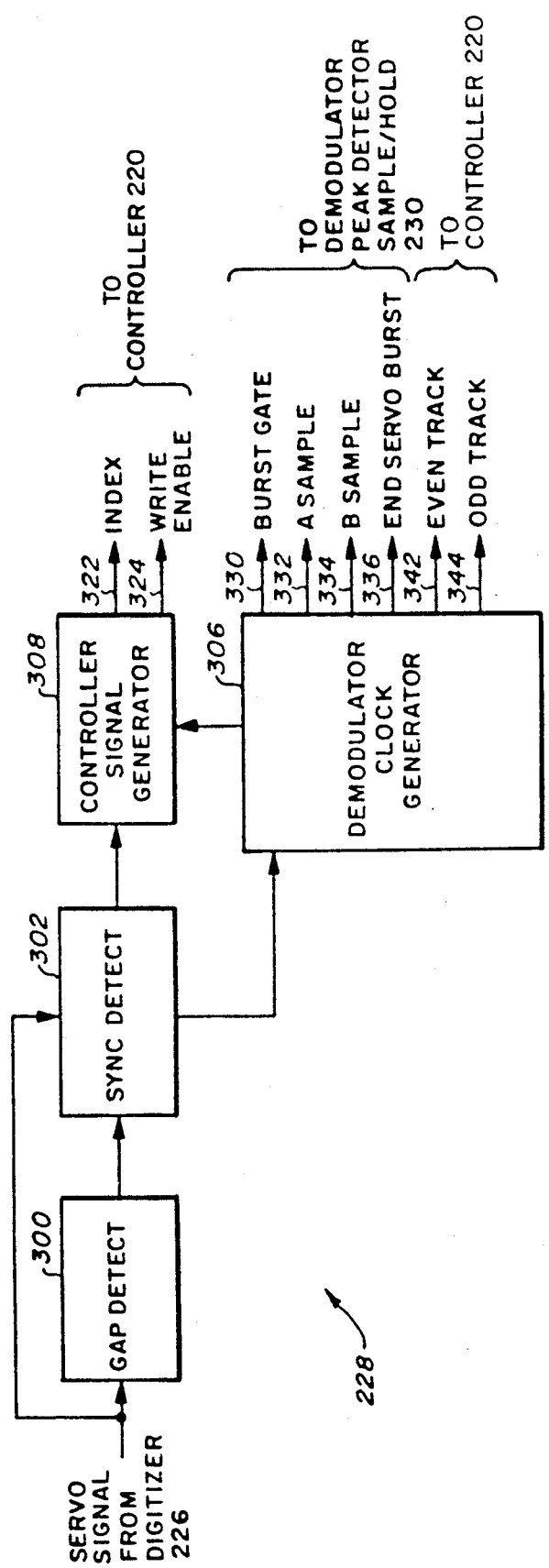
Fig_5

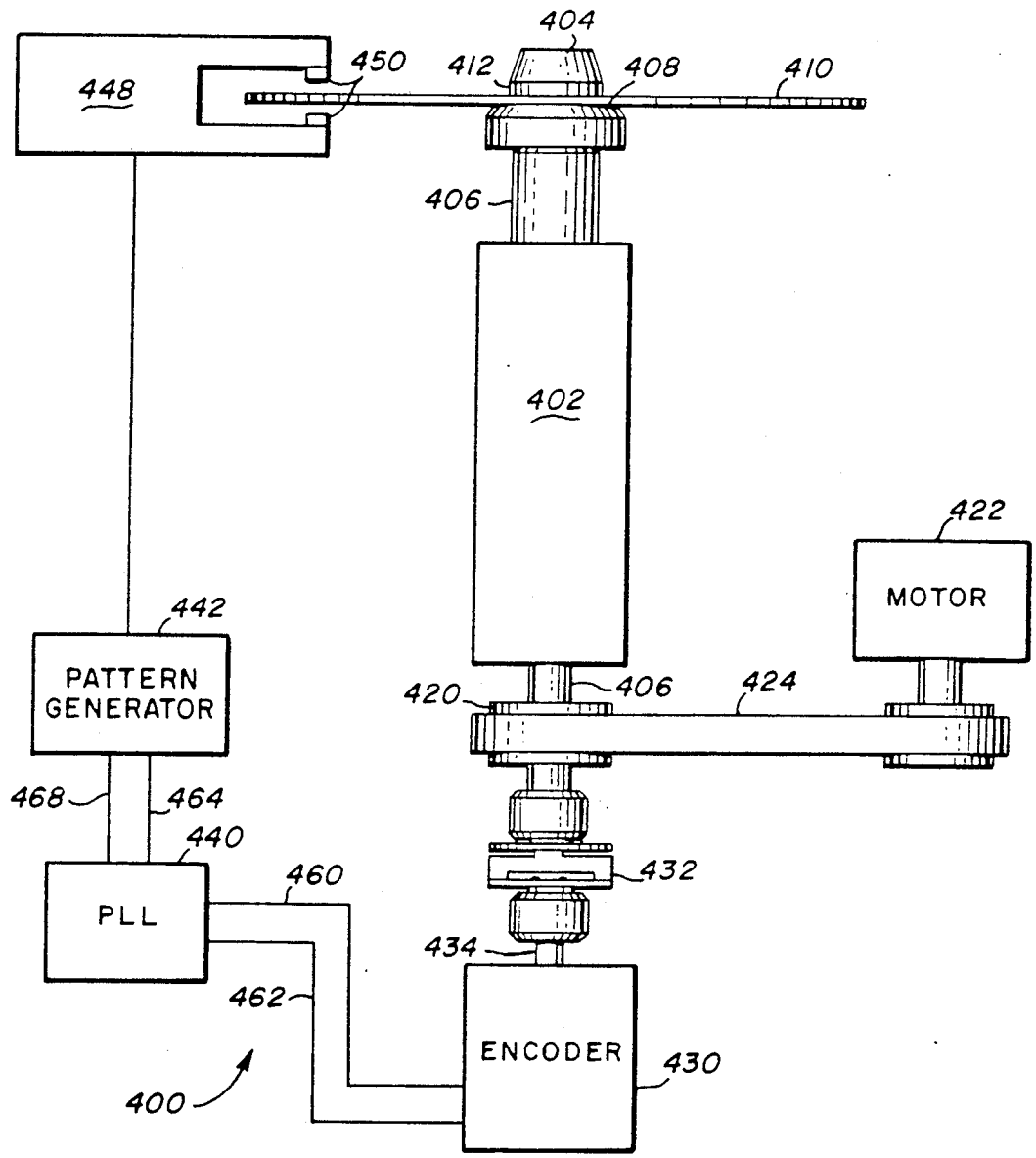
Fig_6

MAGNETIC MEDIA AND SERVO SYNCHRONIZATION METHOD

BACKGROUND OF THE INVENTION

1. Field of the Invention

This invention relates generally to data disk drive systems and more specifically to servo patterns for flexible data disks of such systems.

2. Description of the Prior Art

In electronic computer technology, it is common to store data in binary form on the face of a rotatable disk. The face of the disk is coated with a magnetizable substance such as iron oxide. The disks are operated by rotating them like phonograph records and the binary data is encoded upon, or retrieved from, the face of the disk by a movable magnetic transducer device called a read/write head or transducer head. The binary information is encoded on the face of the disk in concentric rings, called tracks, and the read/write head can move radially along the disk face to select a particular track to record or retrieve information. The data disks can be rigid or flexible.

The rigid disks typically have data densities of about five hundred to twelve hundred tracks per inch of radius of the disk. The flexible disks typically have densities of forty-eight or ninety-six tracks per inch. Because of the high density, precise positioning of the read/write head is necessary so that the head can accurately gain access to a particular desired track on the surface of the disk.

In order to obtain precise positioning, most disk drives use open loop stepper motors. A few disk drives contain a glass scale which provides the disk drive with information on the position of the read/write head. Rigid disk systems sometimes use a different method to obtain positioning information. These rigid disks have a servo sector which is read once per revolution. The servo sector tracks contain positioning data to help the transducer heads stay on the data track. The servo tracks are radially off-set from the data tracks such that a transducer head passes between the servo tracks when it is positioned along a data track.

The consecutive servo tracks alternate between having an "A" burst and a "B" burst. The transducer head reads the "A" and "B" bursts from the servo tracks on either side. The intensities of the "A" and "B" bursts are measured and the head is adjusted to keep the head midway between the servo tracks and thus directly on the data track.

In order for the head to read the servo bursts, the disk drive system must know when to look for them. In order to do this, rigid disks have synchronization marks (sync marks) at the beginning of each servo frame or sector. A servo frame is considered to be a unit of servo information. Some dedicated servos have up to eight thousand such frames per track. When the head reads a synchronization mark, the disk drive system can generate timing pulse windows to look for the servo bursts. The transducer head reads the two servo tracks on either side of it at the same time. The magnetic pulses which comprise the synchronization marks on the consecutive servo tracks must line up perfectly or they will cancel each other out and the disk drive system will not be able to recognize them as the synchronization marks which signify the beginning of a servo sector.

In rigid disk systems, the radial alignment of the synchronization marks on consecutive servo tracks is not a problem. Rigid disks typically have clocking information located on one surface of the disk. The clocking information is read from one side of the disk as the servo tracks are being written on the other side of the disk. Exact alignment of the sync marks during encoding of the disk is thus possible.

In the past, flexible disk systems have not used servo sectors for positioning. The flexible disks are difficult to encode with the servo pattern. When using flexible disks, one side of the disk cannot be read at the same time that the other side of the disk is being encoded. The thin surface of the flexible disk allows cross-talk between the heads on either side. Thus, the clocking technique used to encode servo information on hard disks is not applicable to encoding servo information on flexible disks. Using traditional methods to encode flexible disks results in the synchronization marks being radially misaligned from track-to-track. The misaligned synchronization marks cancel each other out when the transducer head passes between them. When this happens, the disk drive system is unable to generate the timing windows necessary to read the "A" and "B" bursts.

SUMMARY OF THE PRESENT INVENTION

It is an object of the present invention to provide a flexible data disk having a servo pattern.

It is a further object of the present invention to provide a flexible data disk having radially aligned synchronization marks.

It is another object of the present invention to provide a flexible data disk having a back-up synchronization mark for greater reliability.

Briefly, in a preferred embodiment, the present invention provides a flexible data disk which has consecutive servo tracks which have a synchronization and alternate synchronization mark. The synchronization and alternate synchronization marks are in radial alignment from one servo track to the next. Four magnetic pulses represent a synchronization mark and two magnetic pulses represent an alternate synchronization mark. The disk drive system will read and identify the synchronization marks and alternate sychronization marks and start generating timing pulses as appropriate. The servo bursts can then be read.

An advantage of the present invention is that it provides a flexible data disk having a servo pattern.

A further advantage of the present invention is that it provides a flexible data disk which has radially aligned synchronization marks.

Another advantage of the present invention is that it provides a flexible data disk having a back-up synchronization mark for greater reliability. These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a top elevation view of a flexible magnetic disk of the present invention;

FIG. 2A is a diagram of recordings of a portion of the disk shown in FIG. 1;

FIG. 2B is a diagram of recordings of a portion of the disk shown in FIG. 1;

FIG. 2C is a diagram of timing pulses generated from recordings of the disk shown in FIG. 1;

FIG. 3 shows a diagram of the digital and analog signals of the servo pattern of the present invention;

FIG. 4 is a block diagram of a data disk drive system used in connection with the data disk of the present invention;

FIG. 5 is a block diagram of a servo encoder of the disk drive system of FIG. 4;

FIG. 6 is a side elevation view of a servo writer used to encode the disk of the present invention.

DETAILED DESCRIPTION OF THE PREFERRED EMBODIMENT

Figure 7:
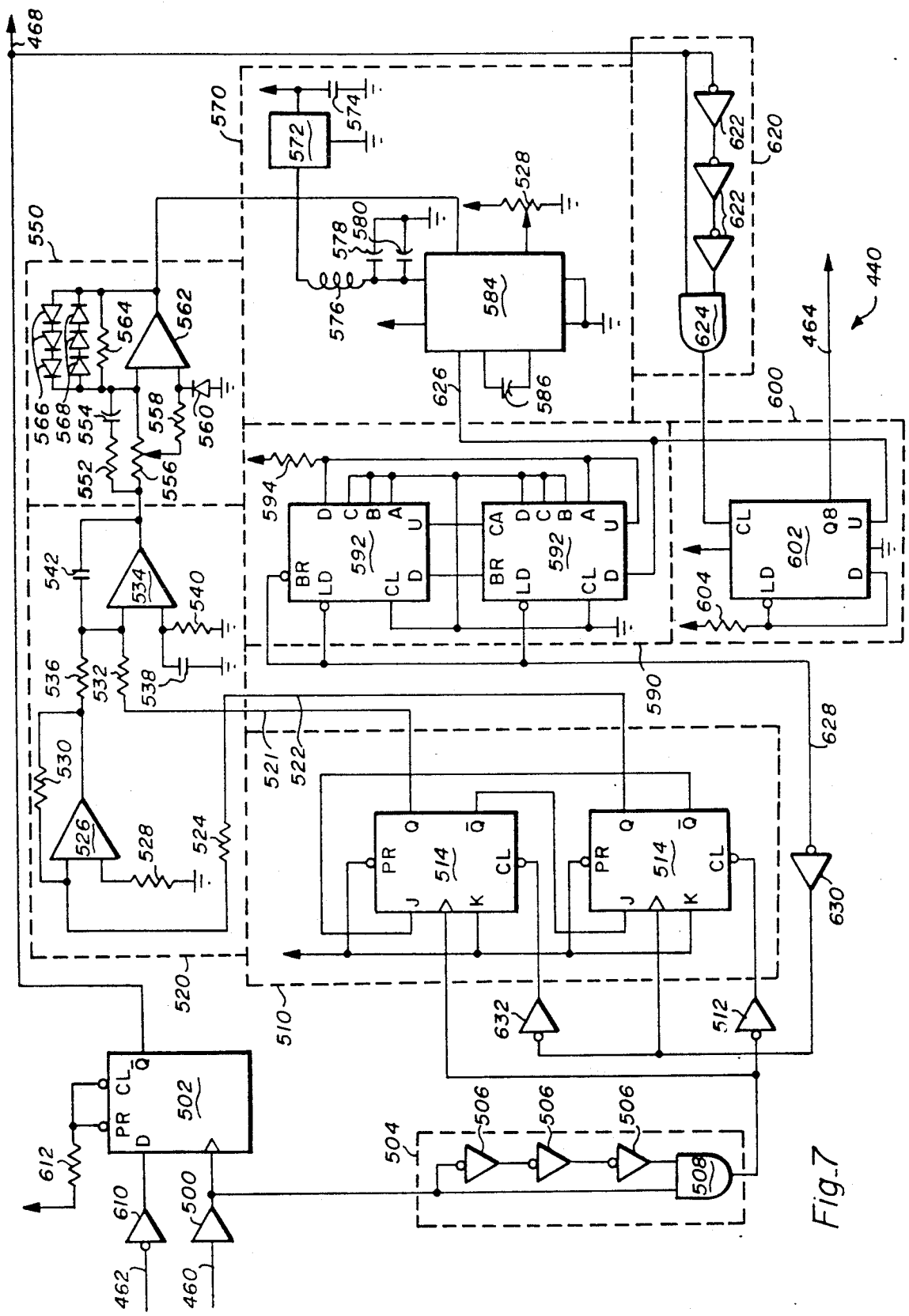
FIG. 7 is a circuit diagram of a phase locked loop portion of the servo writer of FIG. 6.

FIG. 1 shows a flexible magnetic disk of the present invention and is designated by the general reference number 10. The disk 10 is divided into data sectors and servo sectors with a servo sector 12 located between a data sector 14 and a data sector 16. A portion of the disk 10 is referred to by the general reference number 18. Portion 18 overlaps the servo sector 12 and data sectors 14 and 16.

FIG. 2A shows a diagram of recordings of the sectors 12, 14 and 16 within the portion 18 of disk 10. FIG. 2C shows a plurality of corresponding timing pulses 19.

Recordings on the disk portion 18 are divided into a plurality of servo tracks 20, 22, 24, 26, 28 and 30, and a plurality of data tracks 32, 34, 36, 38, 40 and 42. The servo tracks 20-30 are radially off-set from the data tracks 32-42 such that each data track lies half-way between two servo tracks.

The disk 10 is encoded with information in the form of magnetic pulses which are represented by wave forms. To better illustrate such, FIG. 2B is a magnified portion 50 of pulses of the data sector 14. Each magnetic pulse has a width of "T". "T" is a distance which corresponds to a distance a transducer head passes over the disk in eight hundred eight-six nanoseconds when the disk rotates at six hundred rpms.

Within portion 18 are recordings of a speed buffer section 52 which overlaps data sector 14 and servo sector 12. The speed buffer section 52 contains recordings comprising numerous pulses representing zeros. Speed buffer section 52 is located at the end of data sector 14. Thus, when the data sector 14 is written upon, the end of the written data will overlap into the speed buffer section 52. Due to slight variations in the rotation speed of the disk 10 when it is in a disk drive system, the data recordings will not always exactly end at the end of data sector 14. The speed buffer section 52 ensures that there will not be any gaps in the data sector 14 which could be confused with servo gaps.

The servo sector 12 begins in the speed buffer section 52. The servo sector 12 has a servo gap 54 which follows the speed buffer 52. The servo gap 54 does not contain any magnetic pulses. When a transducer head reads the gap, the disk drive system detects the gap and thus knows that it has reached a servo sector 12 and must now look for the synchronization (sync) and alternate synchronization (alternate sync) marks.

A synchronization section 56 follows the servo gap 54. The synchronization section 56 contains a sync mark 58. The sync marks 58, which are shown in FIG. 2A, are typical of all sync marks and comprise four magnetic pulses.

An alternate synchronization section 70 follows the synchronization section 56 and contains an alternate sync mark 72. The alternate sync marks 72 are typical of all alternate sync marks and comprise two magnetic pulses.

In operation, the transducer head is positioned along a data track, such as track 32, between two servo tracks such as 20 and 22. The servo gap 54 is read by the head. The gap 54 is usually fourteen "T"s long. However, the servo gap 54 is thirty-seven "T"s long on one servo sector of the disk. This longer servo gap 54 identifies an index sector or starting point for data writing. After the head detects servo gap 54, the disk drive system looks for either a sync mark or an alternate sync mark. If it reads four pulses, then it knows that it has read a sync mark 58 and the timing windows can be generated using this point as a reference. If two pulses are detected, then the disk drive system knows that an alternate sync mark 72 has been detected and it generates timing windows from that point taking into account the distance between the sync marks 58 and alternate sync marks 72. The timing windows can still be generated based on either a sync mark 58 or alternate sync mark 72 alone. Thus, the disk of the present invention ensures that the critical servo information will be read even if the disk drive does not pick-up one of the sync marks. By using the pattern of the present invention, a more reliable servo system is possible.

The timing signals generated by the data disk drive system allow the system to know when to look for the information contained in the remainder of the servo sector 12. A code beat section 78 follows the alternate synchronization section 70. The code beat section 78 is divided into a subsection 80 and a subsection 82. A code beat mark 84, (also called a code bit mark), is typical of all code beat marks and is comprised of two magnetic pulses. Code beat mark 84 is shown in a first position of subsection 80. Each code beat section contains one code beat mark. The code beat mark is located in one of two positions of the subsection 80 or one of two positions in the second subsection 82. As shown in FIG. 2A, the location of the code beat mark is shifted one position with each consecutive servo track. Thus, servo track 22 has a code beat mark 86 in the second position of subsection 80; servo track 24 has a code beat mark 88 in a first position of subsection 82; and servo track 26 has a code beat mark 90 in a second position of subsection 82.

In operation, the disk drive system uses the timing windows generated from the synchronization section 56 and alternate sychronization section 70 to set-up the section 80 and section 82 of code beat section 78. The head reads between two servo tracks, so two code beat marks are read during one pass through the code beat section 78. If two code beat marks are both detected in either the subsection 80 or subsection 82, then the disk system knows that the data track is an even numbered track. If one code beat mark is detected in the subsection 80 and one code beat mark is detected in the subsection 82, then the system knows that the data track is an odd numbered track.

An "A" servo burst section 100 follows the code beat section 78. A servo burst gap 102 follows the "A" servo burst section 100. A "B" servo burst section 104 follows the servo burst gap 102. Finally, a transition gap 106 follows the "B" servo burst section 104. The consecutive servo tracks alternate between having an "A" burst in section 100 and having a "B" burst in section 104. The servo bursts are comprised of multiple magnetic pulses.

In operation, the timing windows generated from the synchronization and alterate synchronization sections 56 and 70, are used to set-up the timing windows for the sections 100 and 104. A head passes between two servo tracks and reads an "A" burst from one servo track and a "B" burst from the other servo track. The disk drive system measures the intensity of each burst. If the "A" burst measures greater than the "B" burst, then the system moves the head closer to the "B" burst servo track. If the "B" burst is greater than the "A" burst, then the system moves the head closer to the "A" burst servo track. The system thus keeps the head on the data track midway between the servo tracks. After the head reads the servo bursts, the head passes the transition gap 106. The head can be switched from a read to a write mode during the gap 106. The head is then ready to begin writing on the data tracks in data sector 16.

FIG. 3 shows a diagram of the digital and analog signals generated by a transducer head when it reads the encoded servo tracks and is designated by the general reference number 110. Lines 111-114 show the analog signals read from the encoded servo pattern of four consecutive servo tracks of a typical servo sector 115. Line 116-119 represent the signals of lines 111-114, respectively, after they have been digitized. There is a buffer section 120, a servo gap section 122, a synchronization section 124, an alternate synchronization section 126, a code beat section 128, an "A" servo burst section 130, a servo burst gap 132, and a "B" servo burst section 134.

Lines 140-143 show the analog signals read from the encoded servo pattern of four consecutive servo tracks of an index servo sector 145. Lines 146-149 represent the signals of lines 140-143, respectively, after they have been digitized. There is a buffer section 150, a servo gap section 152, a synchronization section 154, an alternate synchronization section 156, a code beat section 158, an "A" servo burst section 160, a servo burst gap 162, and a "B" servo burst section 164. Note that the servo gap section 152 of index servo sector 145 is larger than the servo gap section 122 of the typical servo section 115. As stated above, one servo sector of the disk is designated as an index sector to be used to identify a starting point for writing on the disk. The longer gap section identifies this index sector.

FIG. 4 shows a block diagram of a typical data disk drive system for use with the data disk of the present invention and is designated by the general reference number 200. System 200 may be a KT-510 floppy disk drive manufactured by Konica Technology, Inc. A more detailed description of system 200 is given in U.S. Pat. No. 4,825,310, issued Apr. 25, 1989. A flexible magnetic disk 202 is rotated by a motor 204. Magnetic heads 206 are attached to a carriage 208 which is driven by a linear motor 210. As the disk 202 rotates, the heads 206 read the information on the disk 202. The output signals from heads 206 are sent through an amplifier 212, a filter 214 and an automatic gain control 216. The signal is then sent to a read/write channel 218. The read/write channel 218 separates the signals read from the data sectors 16 into a clock signal and a data signal which in turn are sent to a controller 220. The controller 220 is connected to a central processing unit 222.

The signals from automatic gain control 216 are also sent to a head switch control 224. The head switch control 224 controls the passage of the signal to a digitizer 226. Controller 220 is connected and controls the head switch control 224 which in turn is connected to digitizer 226 which digitizes the signal and sends it to a servo decoder 228 which is connected to a demodulator, peak detect, sample/hold circuit 230 and controller 220. The servo decoder 228 detects the servo gap 54, the sync marks 58 of synchronization section 56 and the alternate sync marks 70 of the alternate synchronization section 70. The servo decoder 228 then generates the appropriate timing pulses or windows. These timing signals are sent to the demodulator, peak detector and sample/hold device 230. Device 230 uses the timing pulses from decoder 228 to read the servo information such as the "A" and "B" servo bursts of section 100 and 104. The device 230 then calculates and sends a position error signal to a compensator 232 which in turn is connected to the linear motor 210. Compensator 232 controls linear motor 210 to move heads 206 to keep the heads on track.

FIG. 5 shows a circuit diagram of the servo decoder 228. The decoder 228 includes a gap detect circuit 300 and the servo signal from the digitizer 226 is passed to the gap detect circuit 300. The gap detect circuit 300 is connected to a sync detect circuit 302, a demodulator clock generator 306 and a controller signal generator 308. When the gap detect 300 detects the servo gap 54, it sends a timing pulse "T2" 310 and a "sync gate" 312 pulse to the sync detect circuit 302. The "T2" 310 and "sync gate" 312 signals set the timing windows for reading the sync and alternate sync sections 56 and 70. The sync detect 302 detects if the servo gap is an index sector, and if it is, the sync detect 302 sends an index signal to the controller signal generator 308. The servo signal is passed to the sync detect circuit 302. The demodulator clock generator 306 sends an end servo burst signal 336 to the controller signal generator 308 when the end of the servo section is read.

The sync detect circuit 302 detects the sync marks 56 or alternate sync marks 70 and sends a start signal to demodulator clock generator 306. The amount of time delay in sending the synchronization signal depends upon whether a sync mark 58 or alternate sync mark 70 was detected.

The controller signal generator 308 generates signals for the controller 220. An index signal 322 signifies that the index sector is being read. A write enable signal 324 prevents the write mode from being used during the time the head is reading a servo sector 12.

The demodulator clock generator 306 generates timing signals for the demodulator, peak detector and sample/hold device 230. A burst gate 330 sets the timing window for reading the "A" and "B" servo bursts. An "A" sample 332 sets the timing for reading the "A" servo burst. A "B" sample 334 sets the timing for reading the "B" servo burst. An end servo burst pulse 336 signifies the end of the servo sector 12. A "T4" pulse 338 sets the timing window for reading the code beat section 78. A "T6" pulse 340 sets the timing window for dividing the code beat section 78 into a first section 80 and a second section 82. Both "T4" 338 and "T6" 340 are generated internally in the demodulator clock generator 306. Using the code beat timing windows, the demodulator clock generator 306 outputs either an even track signal 342 or an odd track signal 344, respectively.

FIG. 2C shows the relationship between the timing pulses and the servo pattern of the disk of the present invention.

FIG. 6 shows a side elevation view of a servo writer and is designated by the general reference number 400. Servo writer 400 is used to encode the servo pattern onto the flexible disk. Servo writer 400 comprises a precision spindle 402. Spindle 402 may be one such as spindle number 1875 made by the Gilman Company. A stainless steel hub 404 is attached to the end of shaft 406 of spindle 402.

Spindle 402 typically has a run-out at its nose-end of 0.0002 inches. Run-out refers to the eccentricity which a shaft exhibits during its rotation. Even a precision spindle, such as spindle 402, is never perfectly aligned and always has some eccentricity in its bearings. However, in order for the servo writer 400 to write the aligned sync and alternate sync marks of the present invention, the run-out at the hub 404 must be less than sixty micro inches. To do this, the hub 404 is attached to shaft 406 before the hub 404 is machined. The hub 404 is then ground to its final shape while attached to spindle 402. The hub 404 is shaped while it is riding on the bearings of spindle 402. This method allows the resulting assembly of hub 404 and spindle 402 to achieve a run-out at the hub 404 of less than sixty micro inches.

The hub 404 has a ledge surface 408 for receiving a flexible disk 410. A cylindrical section 412 of hub 404 fits through a center hole of disk 410. The diameter of cylindrical section 412 is 1.1258 inches plus or minus 0.0001 inches. This makes the diameter of cylindrical section 412 slightly larger than the center hole of disk 410. The media of flexible disk 410 will deform slightly to fit over section 412. The disk 410 will distort evenly to achieve equilibrium and this ensures that disk 410 will be perfectly centered.

A flywheel 420 is attached to the bottom portion of shaft 406. The flywheel 420 is attached to a motor 422 by means of a belt 424. Flywheel 420 dampens any inaccuracies in the motor 422.

Shaft 406 is connected to an encoder 430 by means of a precision coupling 432. Encoder 430 may be a 5VN270 Series Optical Incremental Encoder manufactured by BEI Electronics, Inc. Coupling 432 is needed to prevent the bearings in spindle 402 and encoder 430 from exerting damaging side forces against each other. These side forces would quickly wear out the bearings. Coupling 432 provides angular deflection between shaft 406 and a shaft 434 of encoder 430. At the same time, coupling 432 is rotationally stiff and has very little tortional deflection. This is very important because encoder 430 must be in exact rotational synchronization with disk 410 and must not lead or lag the disk. Coupling 432 may be a T15-20 wafer spring coupling made by PIC Design Company.

Encoder 430 is electrically connected to a phase locked loop circuit (PLL) 440. A pattern generator 442 is electrically connected to PLL 440. Pattern generator 442 is electrically connected to a head carriage 448 which has a pair of transducer heads 450.

In operation, the blank flexible disk 410, which is to be encoded with the servo pattern of the present invention, is placed on hub 404. The flexible disk distorts slightly around the center hole in order to accommodate the cylindrical section 412. The disk 410 is thus automatically centered on hub 404. If the center hole of disk 410 had a larger diameter than section 412, then disk 410 could be mounted and encoded off center. This would cause errors when the disk was later used in a disk drive. After disk 410 is placed on hub 404, a clamp (not shown) is placed over hub 404 and disk 410 to lock disk 410 securely against hub 404.

The motor 422 rotates shaft 406 via flywheel 420 and belt 424. Shaft 406 is rotated at six hundred rpms. At hub 404, disk 410 rotates almost perfectly on its center line with an eccentricity of less than sixty micro inches.

The precision coupling 432 ensures that each radial point of shaft 434 of encoder 430 corresponds to a radial line of disk 410.

Encoder 430 generates thirty-five hundred pulses per revolution. Each pulse corresponds to a radial line of disk 410. These clock pulses are then sent to PLL 440 over a line 460. An index signal is also generated by encoder 430 and is sent to PLL 440 via a line 462. This encoder index signal is generated once per revolution. PLL 440 increases the resolution of the clock signal by multiplying the clock signal to 112875 pulses per revolution. These pulses are in phase with the original thirty five hundred pulses from encoder 430. The 112875 pulse per revolution clock signal is then sent to pattern generator 442 over a line 464. The index signal is passed to generator 442 via line 468. Generator 442 uses the timing pulses to precisely encode the aligned pattern of FIG. 2A onto disk 410 via transducer heads 450.

FIG. 7 shows a circuit diagram of the PLL 440 of FIG. 6. Line 460 from encoder 430 is connected to a buffer 500. Buffer 500 is connected to the reset terminal of a latch 502 and a buffer circuit 504. Buffer circuit 504 is comprised of a series of buffers 506 and an AND gate 508. Buffer circuit 504 is connected to a phase comparator circuit 510 via a buffer 512. Comparator 510 is comprised of a pair of counters 514.

Phase comparator 510 is connected to a charge pump 520 via a pair of lines 521 and 522. Charge pump 520 is comprised of a resistor 524 connected between line 522 and a first input of an operational amplifier 526. A resistor 528 is connected between a second input of amplifier 526 and ground. A resistor 530 is connected between the first input and an output of amplifier 526. A resistor 532 is connected between line 521 and a first input of an operational amplifier 534. A resistor 536 is connected between the output of amplifier 526 and the first input of amplifier 534. A capacitor 538 and a resistor 540 are connected in parallel between ground and a second input of amplifier 534. A capacitor 542 is connected between the first input and an output of amplifier 534.

Charge pump 520 is connected to a compensator 550. Compensator 550 is comprised of a resistor 552, a capacitor 554, a resistor 556, a resistor 558, a diode 560, an operational amplifier 562, a resistor 564, a series of diodes 566, and a series of diodes 568.

Compensator 550 is connected to a voltage controlled oscillator circuit 570. Circuit 570 comprises a voltage regulator 572, a capacitor 574, an inductor 576, a capacitor 578, a capacitor 580, a potentiometer 582, an oscillator 584 and a capacitor 586. Oscillator circuit 570 is connected to a divide-by-one hundred twenty-nine circuit 590. Circuit 590 is comprised of a pair of counters 592 and a resistor 594. A divide-by-four circuit 600 is connected to divide-by-one hundred twenty-nine circuit 590. Divide-by-four circuit 600 comprises a counter 602 and a resistor 604.

Line 462 is connected to a buffer 610. Buffer 610 is connected to the latch 502. Latch 502 is connected to a resistor 612. The output of latch 502 goes to line 468. A buffered circuit 620 is connected to line 468. Circuit 620 is comprised of a series of buffers 622 and an AND gate 624. The output of circuit 620 is connected to the clear input of counter 602.

In operation, the index signal comes into latch 502 and is synchronized to the clock signal from line 460. This index signal is passed onto line 468. Oscillator circuit 570 produces a clock signal on a line 626. This oscillator clock signal is divided by one hundred and twenty-nine at circuit 590. This signal is then output on a line 628 through a buffer 630 and a buffer 632 to phase comparator 510. Phase comparator 510 compares the oscillator clock signal on line 628 with the encoder clock signal from line 460. The phase comparator 510 then generates an error signal if the oscillator clock signal and the encoder clock signal are not in phase. Either line 521 or line 522 will go high depending upon which signal is leading and which signal is lagging. If the signals are both in phase, then lines 521 and 522 will both stay low.

Capacitor 542 of charge pump 520 will be charged or discharged responsive to which of lines 521 or 522 goes high. If both stay low, then the charge on capacitor 542 will remain the same. The compensator 550 generates a voltage signal to oscillator circuit 570 responsive to the error signal from charge pump 520. The frequency of the oscillator circuit is modified accordingly, so that both the oscillator clock signal and the encoder clock signal are in phase. The oscillator clock signal from line 626 is then passed through divide-by-four circuit 600. The end result is that the signal output on line 464 is 112875 pulses per revolution of disk 410 and is precisely in phase with the original encoder clock signal on line 460. The PLL 440 has taken the signal on line 460 of thirty-five hundred pulses per revolution and multiplied it by one hundred twenty-nine and divided it by four to arrive at the 112875 pulses per revolution signal. This high resolution signal generated by PLL 440 enables the pattern generator 442 to exactly align the sync marks and alternate sync marks of the servo pattern.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A method of servo synchronization comprising the steps of:
    defining servo and data sectors on a flexible magnetic disk;
    defining servo tracks and data tracks in said servo and data sectors, respectively;
    defining a gap section, a synchronization section, and a burst section within each servo track;
    defining a first portion and a second portion of said synchronization section;
    encoding said servo tracks with a synchronization mark in said first portion of said synchronization section and an alternate synchronization mark in said second portion of said synchronization section using a precision servo writer, said precision servo writer is comprised of a precision spindle and hub attached to said spindle, such that the run-out at said hub is less than 60 microinches, said hub is shaped to receive said flexible magnetic disk and said hub has a diameter greater than the diameter of a center hole of said flexible magnetic disk; and
    reading said synchronization and alternate synchronization marks with a transducer head and generating timing signals responsive to the detection of said synchronization or alternate synchronization mark.

2. The method of claim 1 wherein,
    encoding said servo tracks with said synchronization mark and said alternate synchronization mark, using said precision servo writer further comprised of an angularly flexible, torsionally rigid coupling member connected to said spindle, and an encoder connected to said coupling member.

3. A method of servo synchronization comprising the steps of:
    defining servo and data sectors on a magnetic disk;
    defining servo tracks and data tracks in said servo and data sectors, respectively;
    defining a gap section, a synchronization section, and a burst section within each servo track;
    defining a first portion and a second portion of said synchronization section;
    encoding said servo tracks with a synchronization mark in said first portion of said synchronization section and an alternate synchronization mark in said second portion of said synchronization section using a precision servo writer, said precision servo writer is comprised of a precision spindle and hub attached to said spindle, such that the run-out at said hub is less than 60 microinches, said precision servo writer further comprises an angularly flexible, torsionally rigid coupling member connected to said spindle, and an encoder connected to said coupling member, said coupling member is a wafer spring coupling; and
    reading said synchronization and alternate synchronization marks with a transducer head and generating timing signals responsive to the detection of a synchronization or alternate synchronization mark.

4. A method of servo synchronization comprising the steps of:
    defining servo and data sectors on a magnetic disk;
    defining servo tracks and data tracks in said servo and data sectors, respectively;
    defining a gap section, a synchronization section, and a burst section within each servo track;
    defining a first portion and a second portion of said synchronization section; encoding said servo tracks with a synchronization mark in said first portion of said synchronization section and an alternate synchronization mark in said second portion of said synchronization section using a precision servo writer, said precision servo writer is comprised of a precision spindle and a hub attached to said spindle, such that the run-out at said hub is less than 60 microinches, said precision servo writer further comprises an angularly flexible, torsionally rigid coupling member connected to said spindle, and an encoder connected to said coupling, a phase locked loop circuit is connected to said encoder, said phase locked loop circuit having a charge pump for generating an error signal; and
    reading said synchronization and alternate synchronization marks with a transducer head and generating timing signals responsive to the detection of a synchronization or an alternate synchronization mark.

* * * * *